US012461927B2

United States Patent
Debnath et al.

(10) Patent No.: US 12,461,927 B2
(45) Date of Patent: Nov. 4, 2025

(54) DOMAIN-SPECIFIC QUESTION ANSWERING WITH CONTEXT REDUCTION FOR DECISION MAKING

(71) Applicant: NEC Laboratories America, Inc., Princeton, NJ (US)

(72) Inventors: Biplob Debnath, Princeton, NJ (US); Md Adnan Arefeen, Kansas City, MO (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/800,781

(22) Filed: Aug. 12, 2024

(65) Prior Publication Data

US 2025/0061118 A1 Feb. 20, 2025

Related U.S. Application Data

(60) Provisional application No. 63/608,492, filed on Dec. 11, 2023, provisional application No. 63/605,658, filed on Dec. 4, 2023, provisional application No. 63/532,639, filed on Aug. 14, 2023.

(51) Int. Cl.
*G06F 17/00* (2019.01)
*G06F 7/00* (2006.01)
*G06F 16/2457* (2019.01)
*G06N 3/092* (2023.01)

(52) U.S. Cl.
CPC ....... *G06F 16/24578* (2019.01); *G06N 3/092* (2023.01)

(58) Field of Classification Search
CPC .......................... G06F 16/24578; G06N 3/092
USPC .......................................................... 707/728
See application file for complete search history.

(56) References Cited

U.S. PATENT DOCUMENTS

| 10,713,519 | B2 * | 7/2020 | Bui | G06Q 10/06 |
|---|---|---|---|---|
| 2009/0158138 | A1 * | 6/2009 | Ruvini | G06F 16/958 |
| | | | | 715/234 |
| 2015/0089373 | A1 * | 3/2015 | Dwivedi | G06F 3/167 |
| | | | | 715/728 |
| 2018/0373952 | A1 * | 12/2018 | Bui | G06V 30/153 |
| 2021/0342399 | A1 * | 11/2021 | Sisto | G06F 16/90332 |
| 2021/0374168 | A1 * | 12/2021 | Srinivasan | G06V 10/82 |

OTHER PUBLICATIONS

Miller, D. (Jun. 7, 2019). Leveraging BERT for extractive text summarization on lectures. arXiv preprint arXiv:1906.04165.

(Continued)

*Primary Examiner* — Pavan Mamillapalli
(74) *Attorney, Agent, or Firm* — Joseph Kolodka; Vincent Duffy

(57) ABSTRACT

Methods and systems for context reduction include identifying a context document relating to a query. A number of sentences of the context document to preserve is determined. The sentences of the context document are ranked according to respective similarities between the sentences and the query. A reduced context is generated that preserves the determined number of highest ranked sentences of the context document and eliminates other sentences from the context document. The query is executed with a language model, including the reduced context in a prompt, to generate a response.

14 Claims, 7 Drawing Sheets

(56) References Cited

OTHER PUBLICATIONS

Chung, H. W., Hou, L., Longpre, S., Zoph, B., Tay, Y., Fedus, W., . . . & Wei, J. (Feb. 18, 2024). Scaling instruction-finetuned language models. Journal of Machine Learning Research, 25(70), 1-53.
Yang, X., Li, Y., Zhang, X., Chen, H., & Cheng, W. (Feb. 16, 2023). Exploring the limits of chatgpt for query or aspect-based text summarization. arXiv preprint arXiv:2302.08081.
Zhang, H., Liu, X., & Zhang, J. (Apr. 9, 2023). Extractive summarization via chatgpt for faithful summary generation. arXiv preprint arXiv:2304.04193.
Ma, C., Wu, Z., Wang, J., Xu, S., Wei, Y., Liu, Z., . . . & Zhang, S. (May 3, 2023). ImpressionGPT: An Iterative Optimizing Framework for Radiology Report Summarization with ChatGPT. arXiv 2023. arXiv preprint arXiv:2304.08448.
Li, Y. (Apr. 24, 2023). Unlocking context constraints of llms: Enhancing context efficiency of llms with self-information-based content filtering. arXiv preprint arXiv:2304.12102.
Gilbert, H., Sandborn, M., Schmidt, D. C., Spencer-Smith, J., & White, J. (Nov. 21, 2023). Semantic compression with large language models. In 2023 Tenth International Conference on Social Networks Analysis, Management and Security (SNAMS) (pp. 1-8). IEEE.
Chen, L., Zaharia, M., & Zou, J. (May 9, 2023). Frugalgpt: How to use large language models while reducing cost and improving performance. arXiv preprint arXiv:2305.05176.
Schlag, I., Sukhbaatar, S., Celikyilmaz, A., Yih, W. T., Weston, J., Schmidhuber, J., & Li, X. (May 9, 2023). Large language model programs. arXiv preprint arXiv:2305.05364.
Laskar, M. T. R., Rahman, M., Jahan, I., Hoque, E., & Huang, J. (Mar. 31, 2023). CQSumDP: a ChatGPT-annotated resource for query-focused abstractive summarization based on debatepedia. arXiv preprint arXiv:2305.06147.
Zhang, H., Liu, X., & Zhang, J. (May 24, 2023). Summit: Iterative text summarization via chatgpt. arXiv preprint arXiv:2305.14835.
Ling, C., Zhao, X., Lu, J., Deng, C., Zheng, C., Wang, J., . . . & Zhao, L. (May 30, 2023). Domain specialization as the key to make large language models disruptive: A comprehensive survey. arXiv preprint arXiv:2305.18703.
Touvron, H., Martin, L., Stone, K., Albert, P., Almahairi, A., Babaei, Y., . . . & Scialom, T. (Jul. 19, 2023). Llama 2: Open foundation and fine-tuned chat models. arXiv preprint arXiv:2307.09288.
ChromaDB. (Accessed Jun. 20, 2023). ChromaDB. https://www.trychroma.com/.
Chase, H., (Oct. 17, 2022). LangChain. https://github.com/hwchase17/langchain.
Slowik, C., Kaiser, F. (Feb. 16, 2023) How Much Does It Cost to Use GPT Models? GPT-3 Pricing Explained. https://neoteric.eu/blog/how-much-does-it-cost-to-use-gpt-models-gpt-3-pricing-explained/.
Brown, T., Mann, B., Ryder, N., Subbiah, M., Kaplan, J. D., Dhariwal, P., . . . & Amodei, D. (Dec. 6, 2020). Language models are few-shot learners. Advances in neural information processing systems, 33, 1877-1901.
Wei, J., Wang, X., Schuurmans, D., Bosma, M., Xia, F., Chi, E., . . . & Zhou, D. (Dec. 6, 2022). Chain-of-thought prompting elicits reasoning in large language models. Advances in neural information processing systems, 35, 24824-24837.
Lewis, P., Perez, E., Piktus, A., Petroni, F., Karpukhin, V., Goyal, N., . . . & Kiela, D. (Dec. 6, 2020). Retrieval-augmented generation for knowledge-intensive nlp tasks. Advances in Neural Information Processing Systems, 33, 9459-9474.
Reimers, N., & Gurevych, I. (Aug. 27, 2019). Sentence-bert: Sentence embeddings using siamese bert-networks. arXiv preprint arXiv:1908.10084.
Lin, C. Y. (Jul. 2004). Rouge: A package for automatic evaluation of summaries. In Text summarization branches out (pp. 74-81).
Bhuyan, S. S., Mahanta, S. K., Pakray, P., & Favre, B. (Sep. 1, 2023). Textual entailment as an evaluation metric for abstractive text summarization. Natural Language Processing Journal, 4, 100028.
Espejel, J. L., Ettifouri, E. H., Alassan, M. S. Y., Chouham, E. M., & Dahhane, W. (Dec. 1, 2023). GPT-3.5, GPT-4, or BARD? Evaluating LLMs reasoning ability in zero-shot setting and performance boosting through prompts. Natural Language Processing Journal, 5, 100032.
Jiao, W., Wang, W., Huang, J. T., Wang, X., Shi, S., & Tu, Z. (Jan. 20, 2023). Is ChatGPT a good translator? Yes with GPT-4 as the engine. arXiv preprint arXiv:2301.08745.
Kočiský, T., Schwarz, J., Blunsom, P., Dyer, C., Hermann, K. M., Melis, G., & Grefenstette, E. (May 1, 2018). The narrativeqa reading comprehension challenge. Transactions of the Association for Computational Linguistics, 6, 317-328.
Liu, Y., Han, T., Ma, S., Zhang, J., Yang, Y., Tian, J., . . . & Ge, B. (Aug. 18, 2023). Summary of chatgpt-related research and perspective towards the future of large language models. Meta-Radiology, 100017.
Luo, Z., Xie, Q., & Ananiadou, S. (Mar. 27, 2023). Chatgpt as a factual inconsistency evaluator for text summarization. arXiv preprint arXiv:2303.15621.
OpenAI-Policy, 2023. OpenAI API data usage policy. https://openai.com/policies/apidata-usage-policies. (Accessed: Jul. 12, 2023).
Schwaber-Cohen, R. (May 3, 2023). Pinecone. Vector database. https://www.pinecone.io/learn/vector-database/.
Tan, Y., Min, D., Li, Y., Li, W., Hu, N., Chen, Y., & Qi, G. (Oct. 27, 2023). Can ChatGPT replace traditional KBQA models? An in-depth analysis of the question answering performance of the GPT LLM family. In International Semantic Web Conference (pp. 348-367). Cham: Springer Nature Switzerland.
Wu, J., Antonova, R., Kan, A., Lepert, M., Zeng, A., Song, S., . . . & Funkhouser, T. (Oct. 11, 2023). Tidybot: Personalized robot assistance with large language models. Autonomous Robots, 47(8), 1087-1102.

* cited by examiner

```
Require: 𝒟: Input documents
Require: q: A set of queries
Require: Θ: a set of predefined thresholds, acts as a set of actions in RL
Ensure: Q*: Trained Q-table
 1: 𝒳 ← ∅                                                    ▷ set of states
 2: for each q, context ∈ q, 𝒟 do
 3:     v_c, v_q ← Embedding(context), Embedding(q)          ▷ get embedding
        vectors
 4:     𝒳 ← 𝒳 ∪ (v_c − v_q)
 5: end for
 6: 𝒮 ← K-Means(𝒳)                              ▷ centroids as state vectors
 7: for each q, context ∈ q, 𝒟 do
 8:     state ← get_state(𝒮, context, q)
 9:     action ← get_action(Θ)
10:     C ← retrieve(q, v_q, θ)                          ▷ context formation
11:     C' ← perform_action(C, action)                      ▷ text reduction
12:     answer ← llm(q, C')
13:     r ← compute_score(answer, original_answer)
14:     reward ← α(2r − r*) − (1 − α) × τ(C', C)
15:     Q(state, action) ← Q(state, action) + 1/n (reward − Q(state, action))  ▷
        Update Q table
16: end for
17: return Q*                                       ▷ return trained Q table
```

FIG. 4

```
Require: 𝒟_t: Test documents
Require: q_t: A set of test queries
Require: Agent: Trained RL-Agent
 1: for each q, context ∈ q_t, 𝒟_t do
 2:     state ← Agent.get_state(Agent.𝒮, context, q)
 3:     action ← Agent.get_action(state)
 4:     C' ← Agent.perform_action(context, action)
 5:     answer ← llm(q, C')
 6:     return answer
 7: end for
```

FIG. 5

DOMAIN-SPECIFIC QUESTION ANSWERING WITH CONTEXT REDUCTION FOR DECISION MAKING

RELATED APPLICATION INFORMATION

This application claims priority to U.S. Patent Application No. 63/532,639, filed on Aug. 14, 2023, to U.S. Patent Application No. 63/605,658, filed on Dec. 4, 2023, and to U.S. Application No. 63/608,492, filed on Dec. 11, 2023, each incorporated herein by reference in its entirety.

BACKGROUND

Technical Field

The present invention relates to machine learning systems and, more particularly, to question answering systems.

Description of the Related Art

Large language models can be used to provide natural language interfaces for information retrieval. In particular, question answering systems may be designed to provide requested information to a user through an interface that accepts natural language inputs and provides natural language outputs. These systems may be referred to as chat bots, whereby a user can interact with the system by conducting a conversation. Questions are passed to the large language model for parsing and responsive information may be drawn from any appropriate source, with a response being generated by the language model to include the responsive information.

SUMMARY

A method for context reduction includes identifying a context document relating to a query. A number of sentences of the context document to preserve is determined. The sentences of the context document are ranked according to respective similarities between the sentences and the query. A reduced context is generated that preserves the determined number of highest ranked sentences of the context document and eliminates other sentences from the context document. The query is executed with a language model, including the reduced context in a prompt, to generate a response.

A system for context reduction includes a hardware processor and a memory that stores a computer program. When executed by the hardware processor, the computer program causes the hardware processor to identify a context document relating to a query, to determine a number of sentences of the context document to preserve, to rank the sentences of the context document according to respective similarities between the sentences and the query, to generate a reduced context that preserves the determined number of highest ranked sentences of the context document and eliminates other sentences from the context document, and to execute the query with a language model, including the reduced context in a prompt, to generate a response.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is pseudo-code for training a policy table to determine a number of sentences in a context document to preserve, in accordance with an embodiment of the present invention;

FIG. 5 is pseudo-code for executing a query using a reduced context document, in accordance with an embodiment of the present invention;

DETAILED DESCRIPTION OF PREFERRED EMBODIMENTS

Large language models (LLMs) can be used to implement question-answering systems and chat bots, thereby providing a natural language interface for information retrieval. However, an LLM is limited to information that was used to train it and cannot answer questions related to information that arose after training or questions dealing with domain-specific information that was not part of the training dataset. This lack of relevant training data can lead an LLM to generate inaccurate responses, particularly where domain-specific information makes use of non-standard terminology or jargon.

However, a pre-trained LLM can still be educated about domain-specific information by providing context to a query as part of the prompt to the LLM. Providing context can be more practical than fine-tuning the LLM using domain-specific knowledge, as an LLM may have billions of parameters to update, particularly when the context changes rapidly over time. Domain-specific information can be provided explicitly to the LLM in the prompt, and the LLM can make use of that information when formulating a response.

However, a given LLM may have a limit to the number of tokens that can make up a prompt. As an example, the ChatGPT 4.0 LLM may accept prompts with up to 32,768 tokens. Additionally, larger prompts may have correspondingly higher execution costs, as the LLM needs to spend additional processing power to handle a longer prompt.

To address these concerns, the context that is provided with the prompt may be limited to the parts that provide the most benefit when the LLM generates a response. By eliminating less relevant tokens, the cost of execution may be decreased and/or more relevant tokens may be used in their place.

Figure 1:
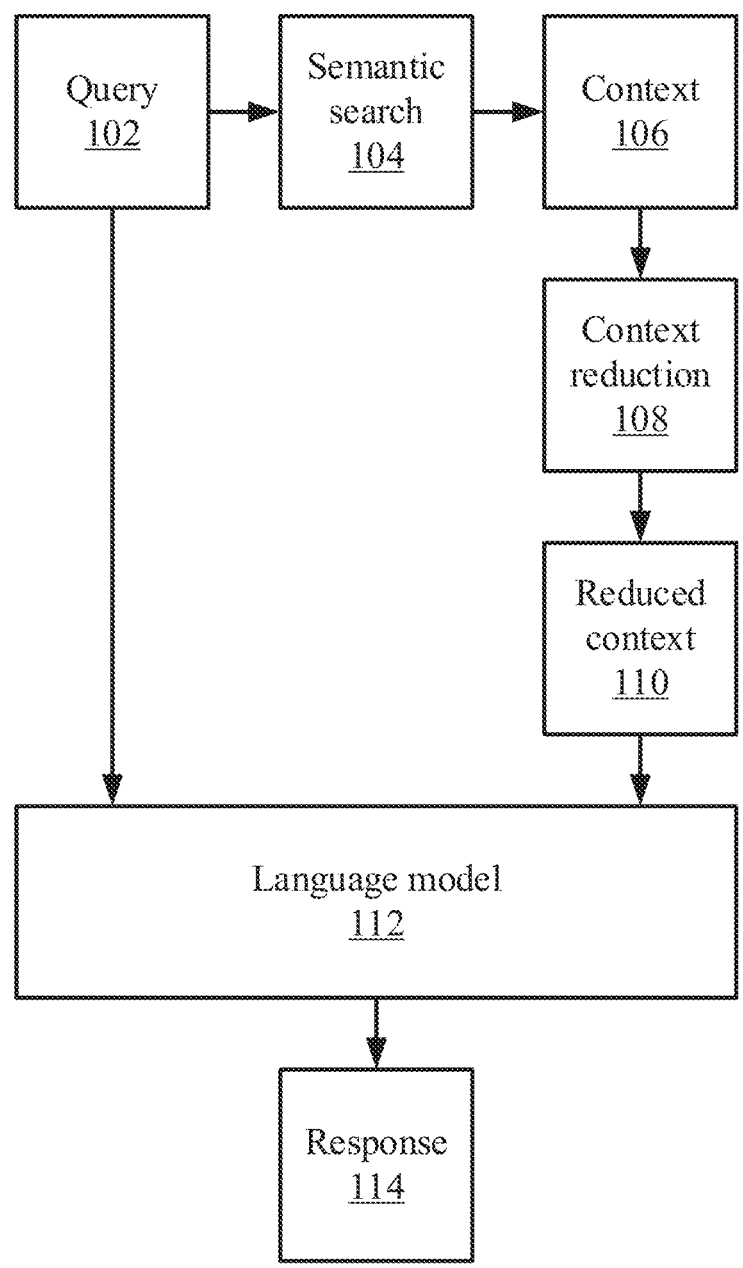
FIG. 1 is a block diagram showing the execution of a query using a large language model, supplemented by a reduced context document, in accordance with an embodiment of the present invention.

Referring now to FIG. 1, an overview of context reduction in a question answering system is shown. A user provides a query 102 that includes, for example, a question relating to domain-specific information or information that was otherwise unused in training a language model 112. A semantic search 104 is performed using the query to identify a context document 106. The search may be performed over a vector database that stores domain-specific documents in small chunks, so that a subset of a relevant domain context can be retrieved from a long document, rather than taking the entire thing.

The context document 106 may be any appropriate source of information relating to the subject matter of the query. For example, the context document may include an academic paper, a user manual, a recent news story, a private information base, or any other type of information that may provide context to the language model 112 in answering the query 102. The context document 106 may be any length and may exceed the maximum size of the input to the language model 112.

Context reduction 108 is performed on the context document 106 to generate reduced context 110. The reduced context 100 includes fewer tokens than the context document 106 and is reduced to a size that can fit within the maximum prompt size of the language model 112. In particular, context reduction 108 may identify the top-k most relevant sentences from the context document 106, sentences outside a range defined by the top k sentences. Other sentences in the range defined by the top k sentences may be further reduced using text reduction methods to preserve their content while reducing the number of tokens they use. The remaining sentences and reduced fragments may be stitched in order of their original appearance in the context document 106 to produce the reduced context 110. The value of k may be determined using reinforcement learning to dynamically determine the number of sentences to preserve from a context document 106 based on the query 102. A response 114 is generated by the language model 112 that answers the query 102, taking advantage of the reduced context 110, without a substantial loss in accuracy from the reduced size of the provided context.

Figure 2:
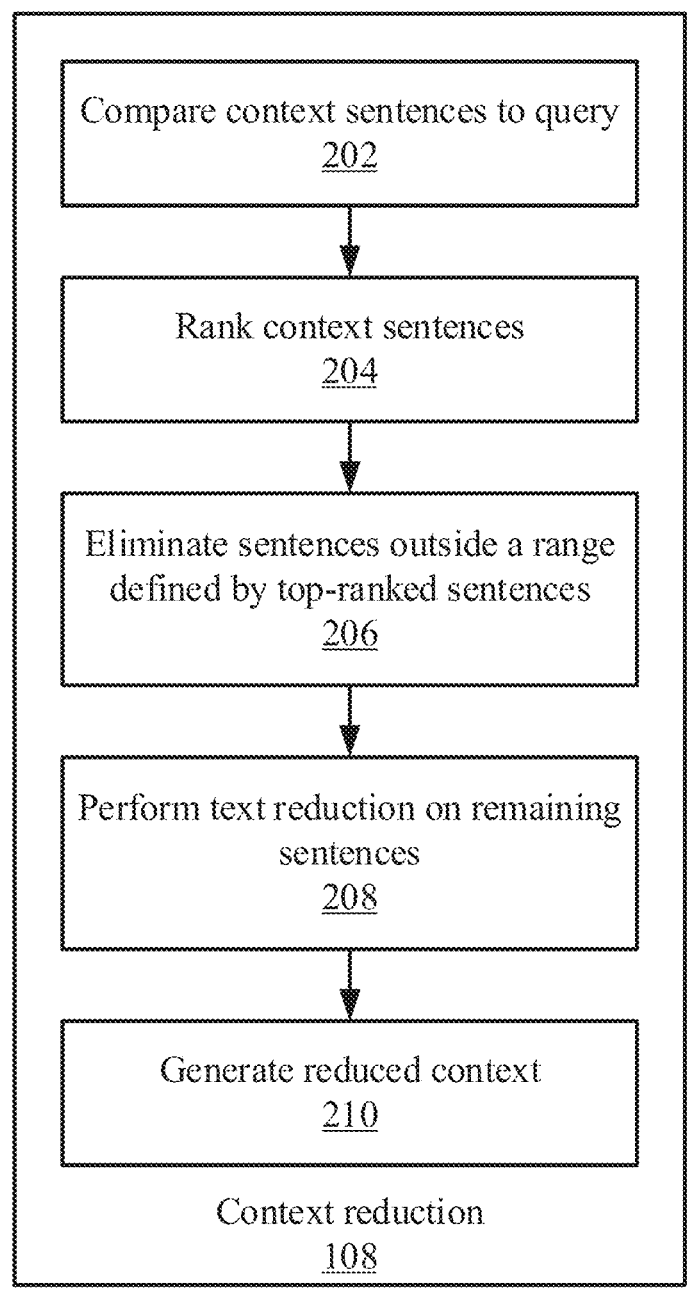
FIG. 2 is a block/flow diagram showing a method for context reduction that ranks sentences of the context document according to relevance to a query, in accordance with an embodiment of the present invention.

Referring now to FIG. 2, additional detail on context reduction 108 is shown. Given a context document C, made up of a set of T tokens, context reduction 108 produces a reduced context C' with a smaller number of tokens t. As the cost of executing the language model 112 may be proportional to the token count of the reduced context 110, this reduction in size reduces the cost of execution.

The token ratio $\tau$ is defined as $\tau=t/T$, and is the amount by which the context can be reduced without sacrificing accuracy acc of the response 114. If the optimal accuracy of the response 114 is acc*, then the optimization problem can be formulated as:

$$\min((1-\alpha)\tau + \alpha|acc - acc^*|)$$

where $\alpha$ is a weight parameter that balances the reduction represented by the token ratio $\tau$ with the loss of accuracy.

For context-based question-answering tasks, the answer to a query may be found within a small number of sentences in a larger context document. Context reduction 108 aims to identify the smallest amount of context for a query 102 that can be used without compromising accuracy. The context document may be represented as a set of n sentences ($S_1$, $S_2$, ..., $S_n$). The sentences may be ranked according to their semantic similarity to the query 102, for example using a cosine similarity metric in block 202 on embedded vectors that represent the sentences $v_s$ and the query $v_q$. Sentence vectors $v_s$ that are more similar to the query vector $v_q$ will be ranked higher than sentence vectors that are less similar to the query vector in block 204.

Block 206 eliminates sentences outside of a range defined by the top-k sentences. For example, the range may be defined by the first sentence in the list that is a top-k-ranked sentence and by the last sentence in the list that is a top-k-ranked sentence, with sentences outside that range being removed. Block 208 performs text reduction on any sentences in the preserved range that are not top-k sentences, to further reduce the length of the context, preserving the semantic meaning of each sentence in fewer tokens. The reduced context 110 is then generated by block 210, maintaining the order of the reduced sentences as they occurred in the original context document 106 to preserve the structural integrity of the context document 106.

Figure 3:
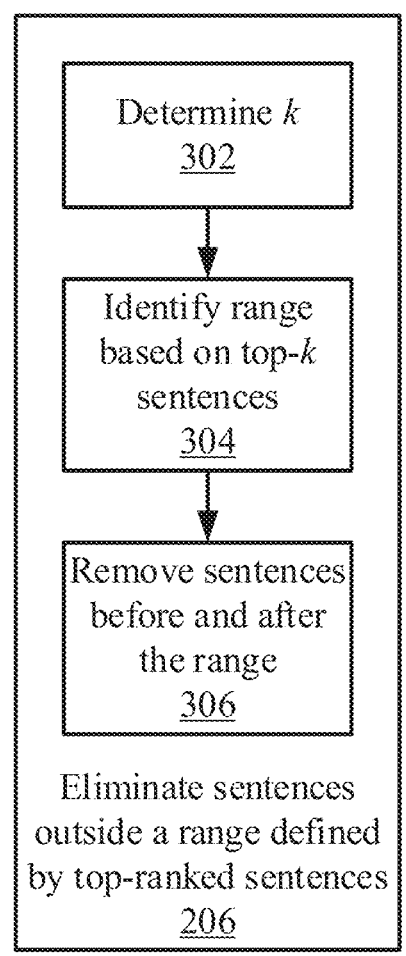
FIG. 3 is a block/flow diagram of a method for eliminating low-ranked sentences from the context document, in accordance with an embodiment of the present invention.

Referring now to FIG. 3, additional detail on the elimination of sentences outside the range defined by the top-ranked sentences 206 is shown. The optimal number of sentences will vary depending on the query 102 and the context document 106. Using a fixed value for k may impact accuracy if k is much smaller than the number n of sentences in the context document 106. On the other hand, if k approaches n then the token ratio is high and the cost of the prompt may be unnecessarily high.

Block 302 therefore uses reinforcement learning to adaptively select k based on these inputs. Lightweight Q-learning-based reinforcement learning may be used to determine an optimal policy $\pi^*$ for an agent operating in an environment. After training, a Q table may be used to identify the best action a (e.g., the optimal k value) for a given state (e.g., an input query 102 and context document 106):

$$\pi^*(\text{state}) = \operatorname*{argmax}_a Q^*(\text{state, action})$$

After an appropriate value for k is selected, block 304 identifies a range of sentences based on the top-k sentences. For example, a first member of the top-k sentences in the context is identified, as is a last member of the top-k sentences in the context, thereby defining a range. Block 306 eliminates any sentences from the context that occur before a first of the top-k ranked sentences and any sentences from the context that occur after a last of the top-k ranked sentences.

Referring now to FIG. 4, pseudo-code for training the policy table Q is shown. In lines 1-6, each state is computed by the subtraction of query embeddings from a context embedding. A k-means model may be trained to get the centroids, and the centroids may be used as different states. In lines 7-15, each threshold is selected as an action, the corresponding reward is computed, and the Q table is updated. The updated Q table is then deployed to reduce the context. The language model 112 may be used to compute the reward. To reduce training cost, this training may be performed on a small number of samples. A full exploration may be used to update the Q table to observe the effect of each action in each state.

Due to the dynamic environment of domains and queries, it is difficult to estimate the optimal context. Reinforcement learning provides good results in situations where the environment is complex and dynamic. After retrieving the context document 106, the state is determined with context and query embedding. The state is used as input to the Q* table to find the recommended action. Based on the action, the threshold for context reduction is computed and top-k sentences are selected. Then the reduced context version is produced by discarding sentences outside limits established by the top-k sentences and reducing any sentences other than the top-k sentences that remain.

The query and context may be combined to define the state. In particular, the embedding of the query $v_g$ can be subtracted from the embedding of the context $v_c$ to provide a context-query pair. After building the vector with a number of training samples, K-means may be used to determine the centroids. These centroids produce state vectors S. At runtime, a query-context pair is concatenated using their embedding vectors and the closest centroid will be used as their state:

$$S \leftarrow k-\text{means}\left(\bigcup_{i,j} v_{c_i} - v_{q_j}\right)$$

where i and j are used to index the different contexts and user queries, respectively.

A range of thresholds may be used, varying from, e.g., 0 to 0.4. These thresholds identify the maximum proportion of the original context document 106 that is preserved. Each choice within this range is considered an action in the reinforcement learning system. The outcome of each action is evaluated through a reward function, which subsequently updates the Q table for the corresponding (state, action) pair.

The reward for the reinforcement learning model is higher if the context ratio is lower and the accuracy is close to the optimal accuracy that would result from using the entirety of the original context document 106. A score r may be computed to evaluate the response 114 using the reduced context 110 in comparison with what the response would be for the full context document 106. If the difference between the score for the response of the reduced context 110 and the score for the response of the full context document 106 is positive, then the action k may be rewarded, otherwise it may be penalized. For the token ration τ, the lower the better, as reduction of the context without compromising accuracy is rewarded. The reward function may be defined as follows:

$$R = -(1-\alpha)\tau + \alpha(2r - r^*)$$

where r is the score for the reduced context 110 and r* is the score for the original context document 106. The score may, in some embodiments, be implemented with a recall-oriented understudy for gisting evaluation, which includes measures to automatically determine the quality of a summary by comparing it to summaries created by humans.

Referring now to FIG. 5, pseudo-code for context inference is shown. For each query 102, the corresponding context 106 is retrieved and the state is computed by the trained reinforcement learning agent in line 2. Based on the state, the threshold θ is computed as an action to select the top-k sentences. The top-k sentences establish a range within the input, with a first-occurring sentence of the top-k sentences representing the beginning of the range and with the last-occurring sentence of the top-k sentences representing the end of the range. Sentences outside of the range (e.g., before the first top-k sentence or after the last top-k sentence) are discarded entirely. Sentences within the range, but which are not among the top-k sentence, are reduced to generate the reduced context C'. The reduced context is used to obtain an answer with a large language model (LLM) in line 5. The response 114 is then returned to the user.

Figure 6:
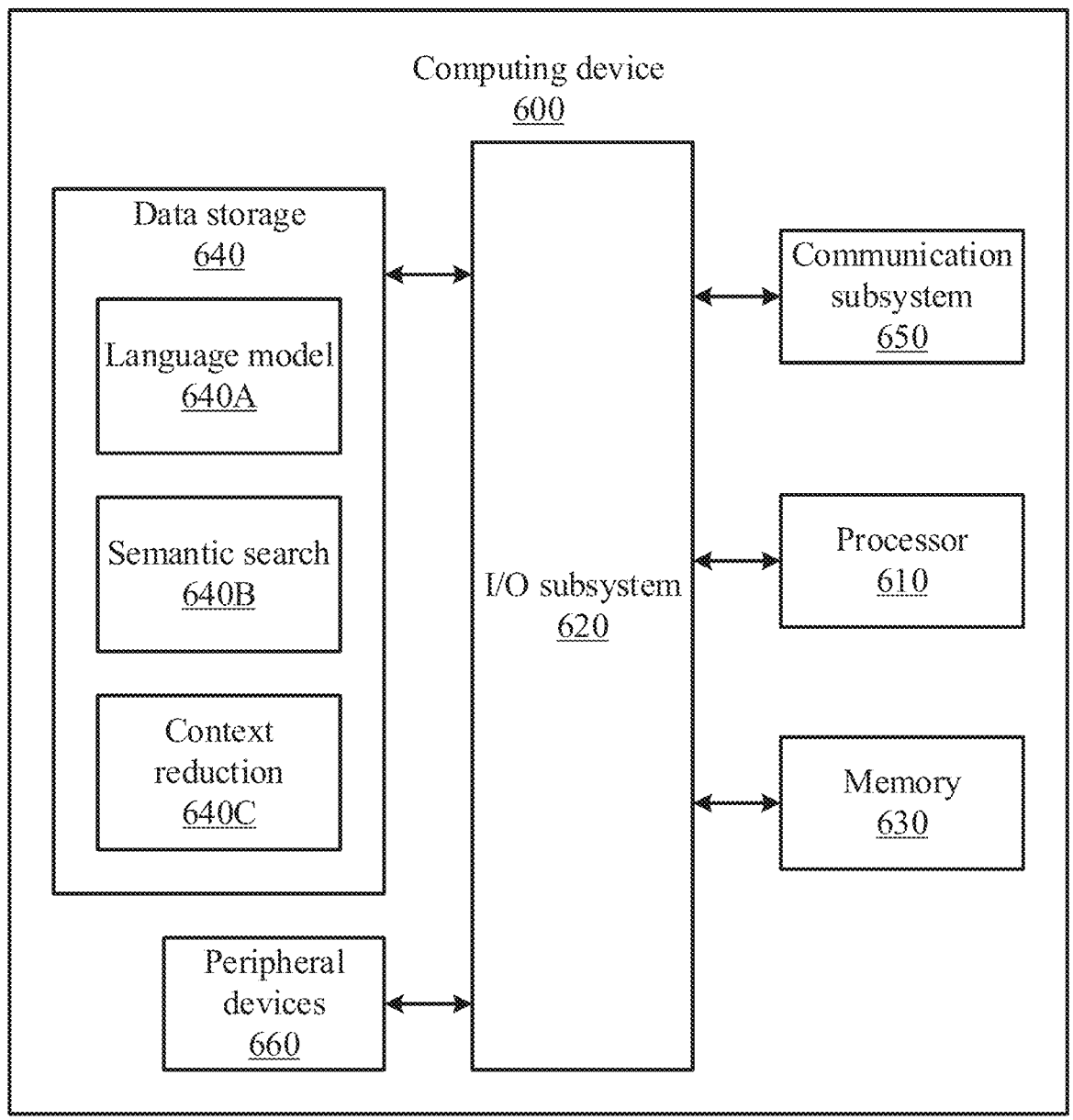
FIG. 6 is a block diagram of a computing device that performs a semantic search using a reduced context document, in accordance with an embodiment of the present invention.

Referring now to FIG. 6, an exemplary computing device 600 is shown, in accordance with an embodiment of the present invention. The computing device 600 is configured to execute a query on a language model using a reduced context document.

The computing device 600 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 600 may be embodied as one or more compute sleds, memory sleds, or other racks, sleds, computing chassis, or other components of a physically disaggregated computing device.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for implementing a language model, 640B for implementing a semantic search of context documents based on a query, and 640C for performing context reduction. Any or all of these program code blocks may be included in a given computing system. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

Figure 7:
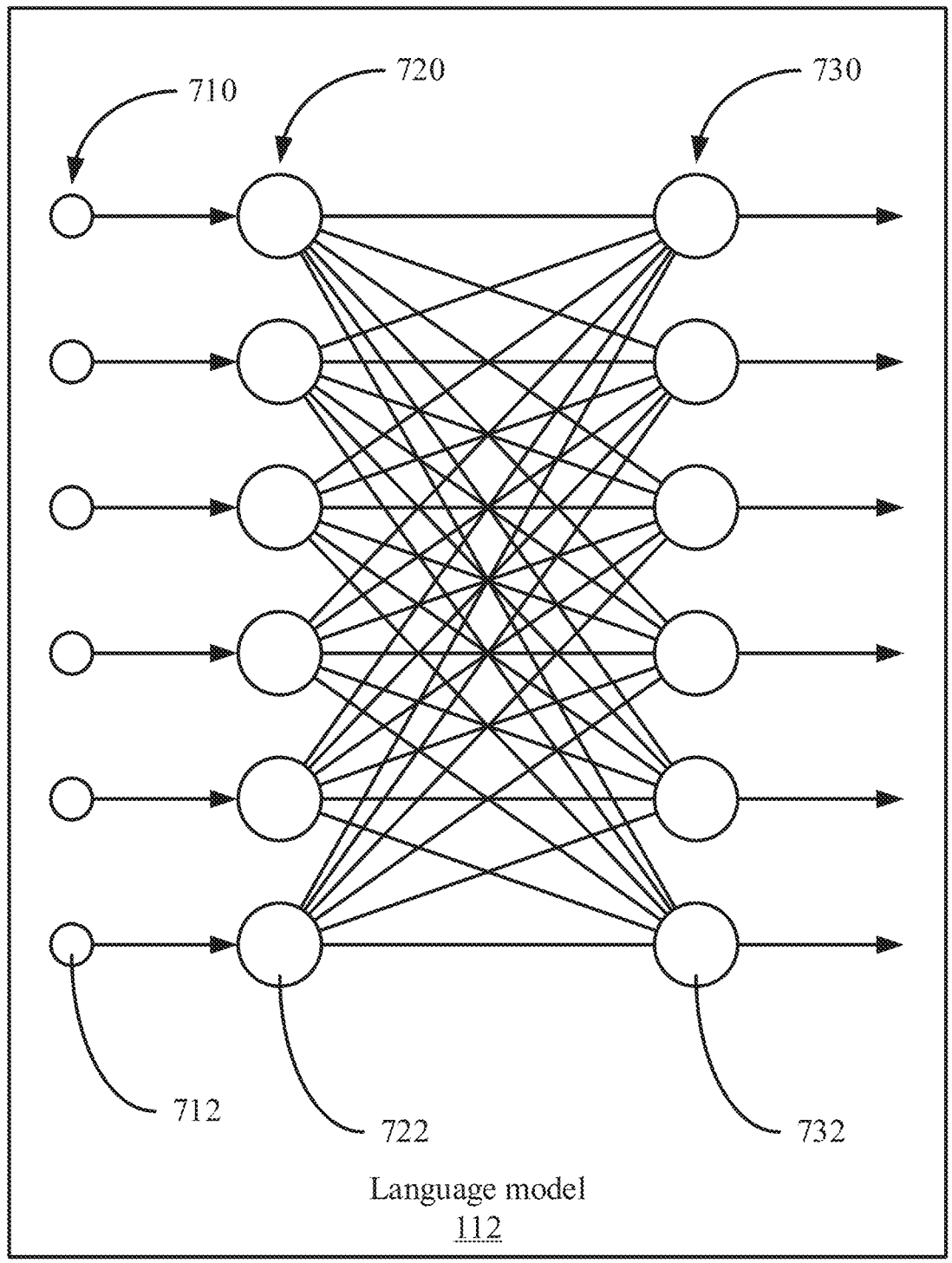
FIG. 7 is a diagram of an exemplary neural network architecture that can be used to implement part of a language model, in accordance with an embodiment of the present invention.
Figure 8:
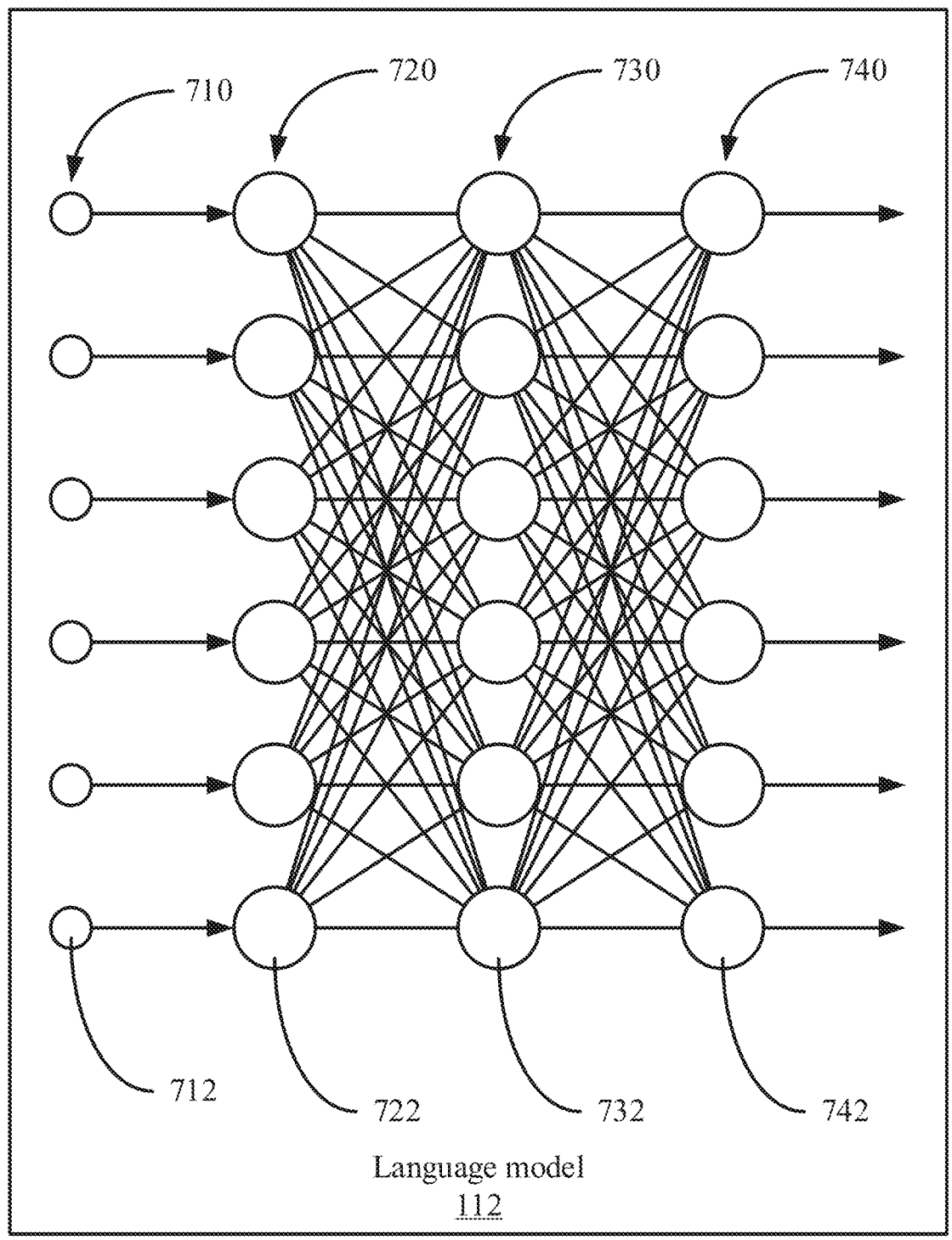
FIG. 8 is a diagram of an exemplary deep neural network architecture that can be used to implement part of a language model, in accordance with an embodiment of the present invention.

Referring now to FIGS. 7 and 8, exemplary neural network architectures are shown, which may be used to implement parts of the present models, such as the language model 112. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the input data belongs to each of the classes can be output.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 720 of source nodes 722, and a single computation layer 730 having one or more computation nodes 732 that also act as output nodes, where there is a single computation node 732 for each possible category into which the input example could be classified. An input layer 720 can have a number of source nodes 722 equal to the number of data values 712 in the input data 710. The data values 712 in the input data 710 can be represented as a column vector. Each computation node 732 in the computation layer 730 generates a linear combination of weighted values from the input data 710 fed into input nodes 720, and applies a non-linear activation function that is differentiable to the sum. The exemplary simple neural network can perform classification on linearly separable examples (e.g., patterns).

A deep neural network, such as a multilayer perceptron, can have an input layer 720 of source nodes 722, one or more computation layer(s) 730 having one or more computation nodes 732, and an output layer 740, where there is a single output node 742 for each possible category into which the input example could be classified. An input layer 720 can have a number of source nodes 722 equal to the number of data values 712 in the input data 710. The computation nodes 732 in the computation layer(s) 730 can also be referred to as hidden layers, because they are between the source nodes 722 and output node(s) 742 and are not directly observed. Each node 732, 742 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the input data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 732 in the one or more computation (hidden) layer(s) 730 perform a nonlinear transformation on the input data 712 that generates a feature space. The classes or categories may be more easily separated in the feature space than in the original data space.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for context reduction, comprising:
    identifying a context document relating to a query;
    training a policy using reinforcement learning to balance a token ratio and an accuracy difference, including a reward function:

$$R = -(1-\alpha)\tau + \alpha(2r - r^*)$$

where $\tau = t/T$ is a token ratio between a number of tokens t in the reduced context and a number of tokens T in the context document, r is a score representing accuracy of an output generated by the language model using the reduced context, $r^*$ is a score representing accuracy of an output generated by the language model using the context document, and $\alpha$ is a weighting parameter;
    determining a number of sentences of the context document to preserve, including applying the query and the context document to the policy to select a proportion of the context document to preserve;
    ranking the sentences of the context document according to respective similarities between the sentences and the query;
    generating a reduced context that preserves the determined number of highest ranked sentences of the context document and eliminates other sentences from the context document; and
    executing the query with a language model, including the reduced context in a prompt, to generate a response.

2. The method of claim 1, wherein generating the reduced context includes eliminating sentences before a first of the highest ranked sentences and sentences after a last of the highest ranked sentences in the context document.

3. The method of claim 1, wherein generating the reduced context further includes performing text reduction on sentences other than the highest ranked sentences that occur after a first of the highest ranked sentences and before a last of the highest ranked sentences in the context document.

4. The method of claim 1, wherein generating the reduced context includes preserving an order of the highest-ranked sentences from the context document.

5. The method of claim 1, wherein ranking the sentences includes determining a similarity score between the query and each respective sentence.

6. The method of claim 5, wherein determining the similarity score includes determining a cosine similarity between embeddings of the query and each respective sentence.

7. The method of claim 1, wherein the context document includes subject matter that was not used in training the language model.

8. A system for context reduction, comprising:
a hardware processor; and
a memory that stores a computer program which, when executed by the hardware processor, causes the hardware processor to:
identify a context document relating to a query;
train a policy using reinforcement learning to balance a token ratio and an accuracy difference, including a reward function:

$$R = -(1-\alpha)\tau + \alpha(2r - r^*)$$

where $\tau = t/T$ is a token ratio between a number of tokens t in the reduced context and a number of tokens T in the context document, r is a score representing accuracy of an output generated by the language model using the reduced context, $r^*$ is a score representing accuracy of an output generated by the language model using the context document, and $\alpha$ is a weighting parameter;
determine a number of sentences of the context document to preserve, including application of the query and the context document to the policy that selects a proportion of the context document to preserve;
rank the sentences of the context document according to respective similarities between the sentences and the query;
generate a reduced context that preserves the determined number of highest ranked sentences of the context document and eliminates other sentences from the context document; and
execute the query with a language model, including the reduced context in a prompt, to generate a response.

9. The system of claim 8, wherein the computer program further causes the hardware processor to eliminate sentences before a first of the highest ranked sentences and sentences after a last of the highest ranked sentences in the context document.

10. The system of claim 8, wherein the computer program further causes the hardware processor to perform text reduction on sentences other than the highest ranked sentences that occur after a first of the highest ranked sentences and before a last of the highest ranked sentences in the context document.

11. The system of claim 8, wherein the computer program further causes the hardware processor to preserve an order of the highest-ranked sentences from the context document in the reduced context.

12. The system of claim 8, wherein the computer program further causes the hardware processor to determine a similarity score between the query and each respective sentence.

13. The system of claim 12, wherein the computer program further causes the hardware processor to determine a cosine similarity between embeddings of the query and each respective sentence as the similarity score.

14. The system of claim 8, wherein the context document includes subject matter that was not used in training the language model.

* * * * *